United States Patent [19]

Fulop

[11] Patent Number: 4,788,882
[45] Date of Patent: Dec. 6, 1988

[54] FLYWHEEL

[76] Inventor: Charles Fulop, 14736 Hideaway Lake La., Delray Beach, Fla. 33446

[21] Appl. No.: 167,581

[22] Filed: Mar. 14, 1988

[51] Int. Cl.$^4$ .............................................. F16H 27/04
[52] U.S. Cl. ...................................... 74/572; 74/84 S
[58] Field of Search ........................... 79/572, 573, 574

[56] References Cited

U.S. PATENT DOCUMENTS

| | | | |
|---|---|---|---|
| 1,953,964 | 4/1934 | Laskowitz | 74/84 S |
| 2,404,515 | 7/1946 | Meyer | 74/572 |
| 3,142,901 | 8/1964 | Bodine | 74/572 X |
| 3,750,484 | 8/1973 | Benjamin | 74/84 S |
| 3,968,700 | 7/1976 | Cuff | 74/84 S |
| 4,497,393 | 2/1985 | Brems | 74/574 |

FOREIGN PATENT DOCUMENTS 573912  3/1958  Italy ...................................... 74/84 S Primary Examiner—Peter A. Aschenbrenner
Attorney, Agent, or Firm—Oltman and Flynn

[57] ABSTRACT

A flywheel having a hollow rotatable structure which is driven for rotation on a predetermined axis and presents a cam surface eccentrically surrounding that axis, a guide arrangement inside the rotatable structure presenting a plurality of slideways extending outward from that axis to the cam surface, and rollers slidable along those slideways and engageable with the cam surface. The rotatable structure is rotatable with respect to the guide arrangement. The rollers provide the only coupling between the rotatable structure and the guide arrangement.

10 Claims, 3 Drawing Sheets

4,788,882

FLYWHEEL

SUMMARY OF THE INVENTION

This invention relates to a flywheel.

In accordance with the present invention, there is provided a flywheel having a hollow rotatable structure coupled to a rotary drive shaft to rotate in unison with it on a predetermined axis of rotation, cam means on the rotatable structure presenting a cam surface encircling the axis of rotation and extending eccentric to it, guide means inside the rotatable structure presenting a plurality of slideways which extend outward from that axis to the cam surface, and a plurality of rollers slidable along those slideways and engageable with the cam surface and providing the only coupling between the guide means and the rotatable structure.

A principal object of this invention is to provide a novel flywheel.

Further objects and advantages of this invention will be apparent from the following detailed description of two presently preferred embodiments which are illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
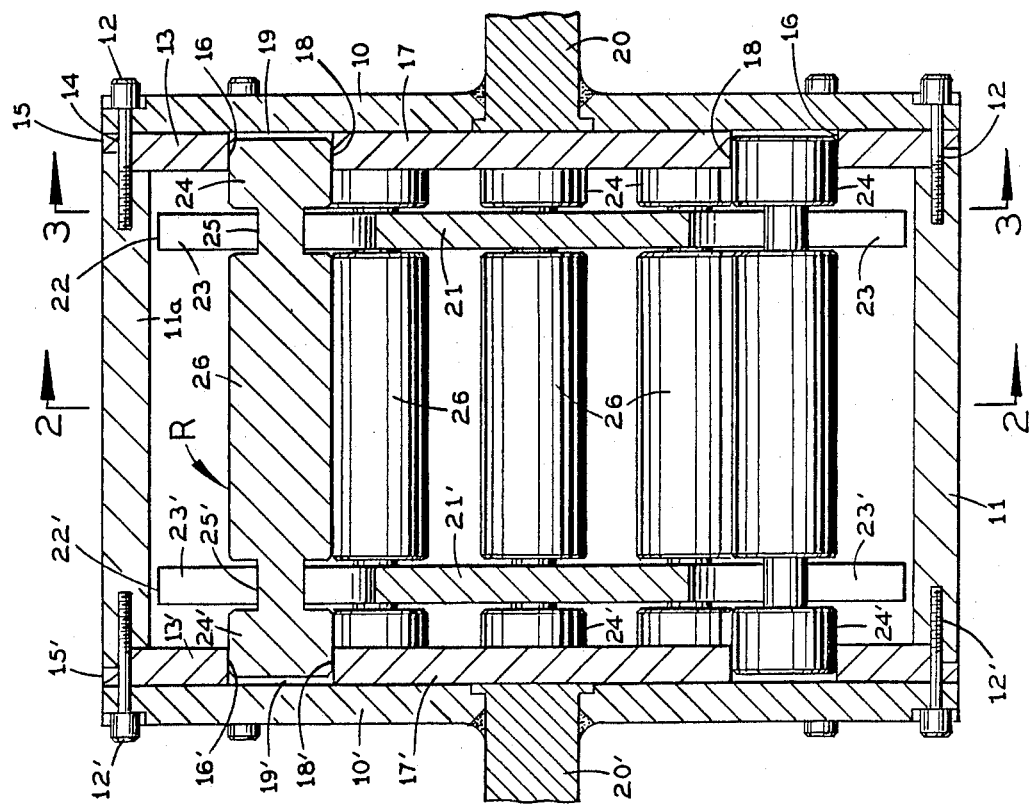
FIG. 1 is a section taken axially through a flywheel in accordance with a first embodiment of this invention.

Referring to FIG. 1, the first embodiment of the present invention has a unitary rotatable hollow structure having first and second, rigid, opposite end plates 10 and 10', each having a cylindrical periphery, and a cylindrical housing body 11 extending between the end plates and attached to them by bolts 12 at end plate 10 and bolts 12' at end plate 10'. The hollow rotatable structure has an axis of rotation shown at A in FIG. 2.

The rotatable structure also has a first annular outer cam plate 13 engaged between the inner face of the first end plate 10 and the adjacent end of cylindrical body 11. The bolts 12 at this end of the flywheel extend through corresponding openings 14 in cam plate 13. Cam plate 13 has a cylindrical outer periphery 15 which matches the peripheries of end plate 10 and the cylindrical housing body 11. Cam plate 13 has a cylindrical inner periphery 16 (FIG. 2) which is off-center from the central axis A of the rotatable structure 10,10',11. The axis of this cam plate's inner periphery 16 is shown at C in FIG. 2.

The rotatable structure also has a first inner cam plate 17 rigidly affixed to the inner face of its first end plate 10. Cam plate 17 has a cylindrical outer periphery 18 (FIG. 2) which is concentric with the inner periphery 16 of the outer cam plate 13 and is positioned radially inward from it so that together they define a cylindrical track 19 which eccentrically encircles the rotational axis A of the rotatable structure.

At the opposite second end plate 10' of the rotatable structure are a second annular outer cam plate 13' and a second inner cam plate 17' which are mirror images of cam plates 13 and 17. Corresponding parts of cam plates 13' and 17' are given the same reference numerals, with a "prime" suffix added, as the parts of cam plates 13 and 17. The second outer cam plate 13' is rigidly connected by bolts 12' to the second end plate 10' and cylindrical housing body 11. The second inner cam plate 17' is rigidly affixed to the inner face of end plate 10'. The inner periphery 16' of outer cam plate 13' and the outer periphery 18' of inner cam plate 17' together define a cylindrical track 19' which is concentric about the cam axis C and therefore is eccentric to the rotational axis A of the rotatable structure.

A rotary input shaft 20 is welded or otherwise rigidly attached to the first end plate 10, and a rotary output shaft 20' is similarly affixed to the second end plate 10'. Both shafts are rotatable on the axis A.

Guide means in the form of first and second guide plates 21 and 21' are located inside the cylindrical housing body 11 of the rotatable structure toward the end plates 10 and 10', respectively.

Figure 2:
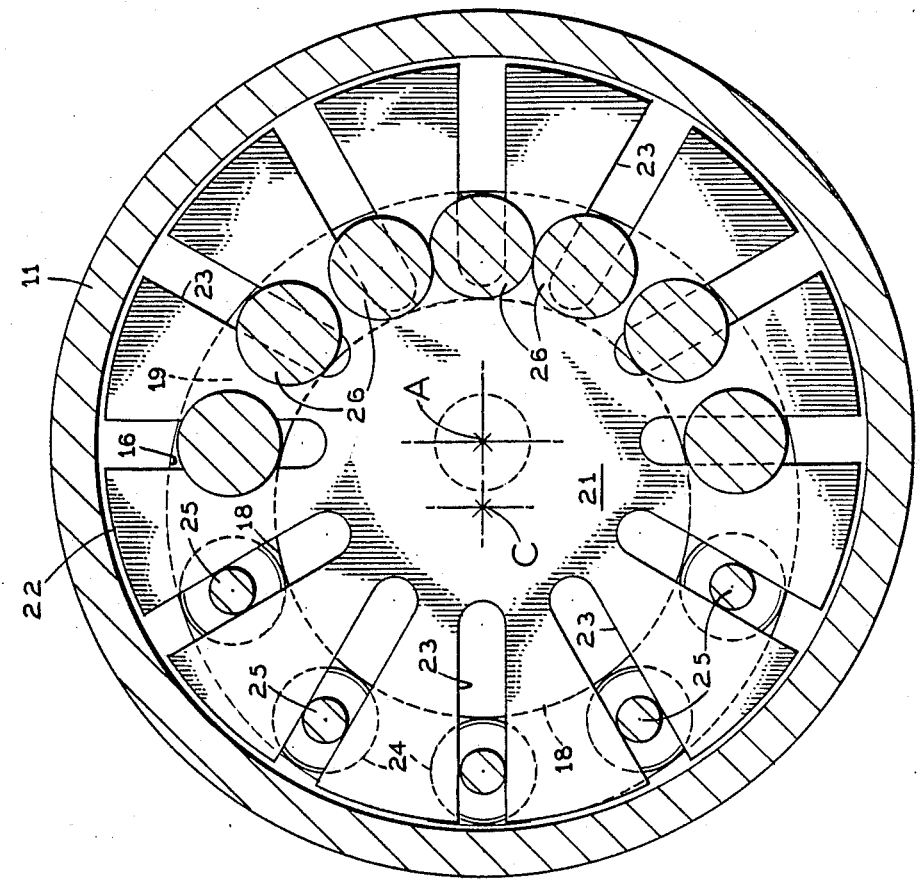
FIG. 2 is a cross-section taken along the line 2—2 in FIG. 1.

As shown in FIG. 2, the first guide plate 21 has a cylindrical outer periphery 22 which is concentric with and spaced slightly inward (radially) from the inside face 11a of the cylindrical housing body 11 of the rotatable structure. Guide plate 21 has a plurality of radial slots 23 which are open at its outer periphery and are evenly spaced circumferentially around this guide plate. Each of the slots 23 extends radially inward toward the axis A. Each slot 23 is a slideway in the guide plate.

The second guide plate 21' is identical to guide plate 21. It has a cylindrical periphery 22' and radial slots 23' which are aligned with the slots 23 in the first guide plate.

The flywheel has a plurality of relatively massive rollers R which coact with the cam tracks 19 and 19' in the rotatable structure and the radial slot slideways 23 and 23' in the guide plates 21 and 21'.

Each roller R has the shape shown in detail for the uppermost roller in FIG. 1. The roller has a cylindrical relatively large diameter, first end segment 24 on its right end which is in rolling engagement with the inner periphery 16 of the first outer cam plate 13 and the outer periphery 18 of the first inner cam plate 17, a cylindrical first neck 25 of smaller diameter which is slidably received in a corresponding radial slot 23 in guide plate 21, a cylindrical middle segment 26 of the same diameter as end segment 24 and extending between guide plates 21 and 21', a cylindrical second neck 25' of smaller diameter which is slidably received in a corresponding radial slot 23' in the second guide plate 21', and a cylindrical second end segment 24' of the same diameter as end segment 24 and middle segment 26 and in rolling engagement with the inner periphery 16' of the second outer cam plate 13' and the outer periphery 18' of the second inner cam plate 17'.

With this arrangement, the rollers R cannot shift a significant amount axially with respect to the guide plates 21 and 21', and vice versa. As shown in FIG. 1, the opposite end segments 24 and 24' of each roller extend almost to the end plates 10 and 10', respectively, of the rotatable structure so the rollers cannot shift a substantial amount axially inside the rotatable structure.

The guide plates 21 and 21' are rotatable inside the rotatable structure 10,10',11, but they are coupled to the rotatable structure only through the rollers R.

Figure 3:
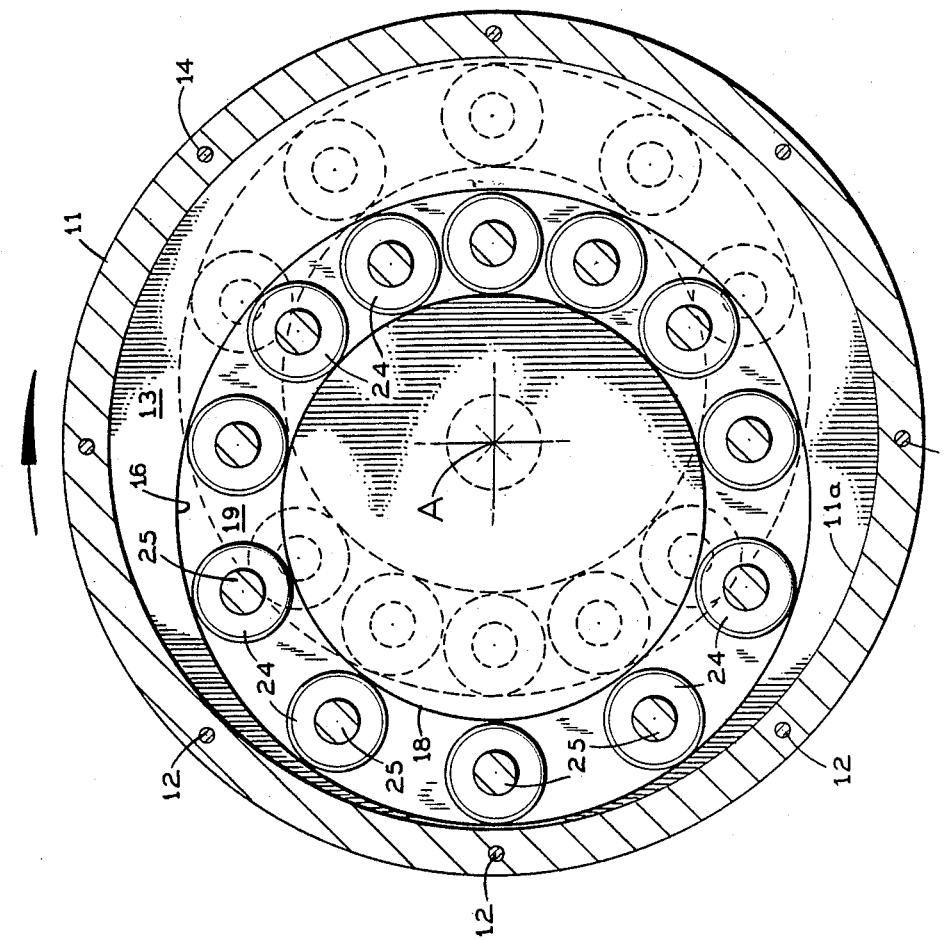
FIG. 3 is a cross-section taken along the line 3—3 in FIG. 1.

In the operation of this flywheel, as the drive shaft 20 rotates the rotatable structure 10,10',11,12,12',13,17,13',17' on the axis A, the cam plates 13,17,13' and 17' move the rollers R in and out along the radial slots 23 and 23' in guide plates 21 and 21' between the extremes shown in full lines and in phantom in FIG. 3. This in-and-out radial movement of the rollers R produces a rotational moment of force eccentric to the rotational axis A of the rotatable structure 10,10',11,12,12',13,17,13',17' and imparts rotation to the guide plates 21 and 21' in the same direction as the rotatable structure but at a slower speed. Consequently, the rollers R and the guide plates 21 and 21' constitute a rotating mass "floating" inside the rotatable structure 10,10',11,12,12',13,17,13',17' which tends to maintain the rotational speed of shafts 20 and 20' when the energy input to shaft 20 changes.

Figure 4:
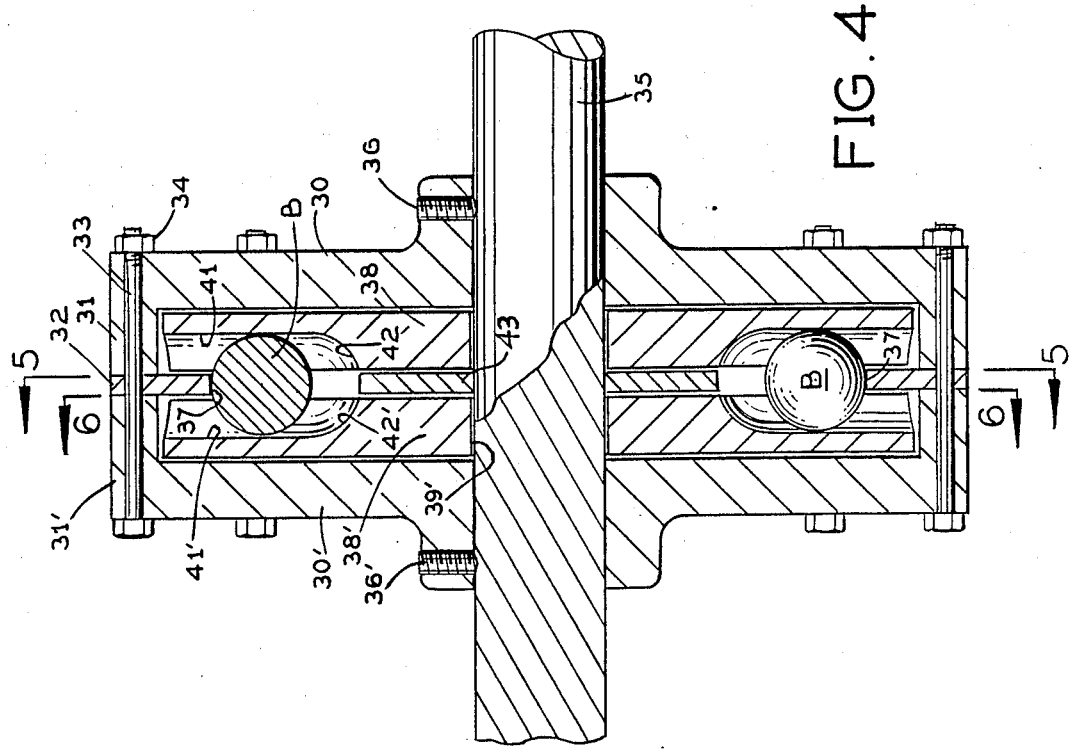
FIG. 4 is a section taken axially through a flywheel in accordance with a second embodiment of this invention.
Figure 5:
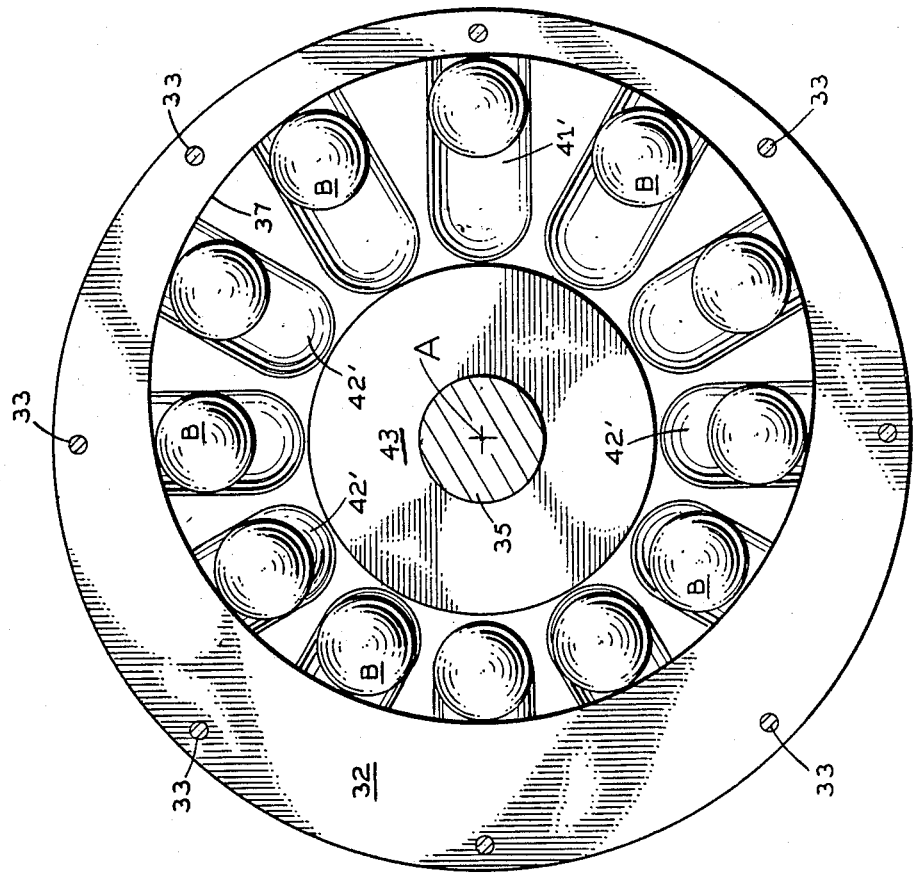
FIG. 5 is a cross-section taken along the line 5—5 in FIG. 4.
Figure 6:
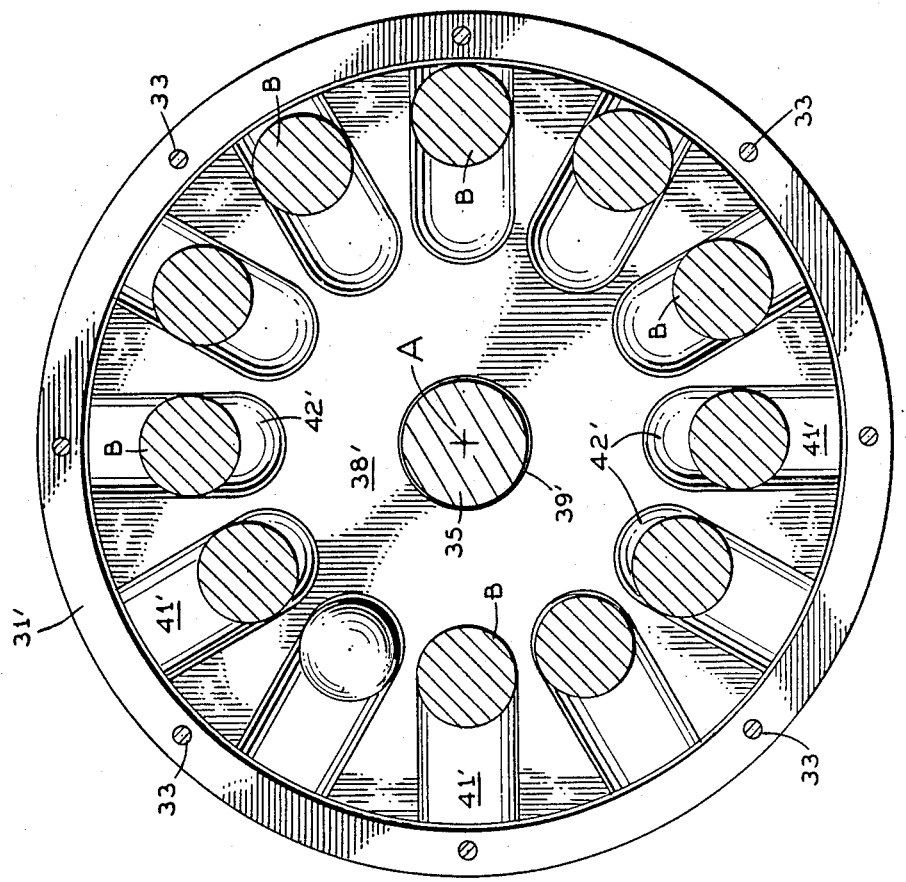
FIG. 6 is a cross-section taken along the line 6—6 in FIG. 4.

A second embodiment of the invention is shown in FIGS. 4–6. In this embodiment the rotatable structure of the flywheel has opposite end plates 30 and 30' having cylindrical peripheral flanges 31 and 31' which extend toward each other, a cam plate 32 engaged between these flanges, bolts 33 passing through the end plate flanges and the cam plate, and nuts 34 on the bolts at one end for clamping these parts together to form a rigid structure. The end plates are fastened to a rotatable drive shaft 35 in any suitable manner, such as by set screws 36 and 36'. The shaft 35 and the rotatable structure 30,31, 30',31',32,33,34 have an axis of rotation shown at A in FIG. 5.

Referring to FIG. 5, the cam plate 32 has a cylindrical inner periphery 37 whose axis is offset from and parallel to the rotational axis A, so this inner peripheral surface is eccentric to axis A.

The rollers in this embodiment of the invention are spherical balls B which are engageable with the cam plate surface 37 when the flywheel rotates. These rollers are held by a guide means in the form of grooved opposite guide plates 38 and 38' which have a running fit between the flanged end plates 30 and 30' and the opposite sides of cam plate 32. As shown in FIGS. 4 and 6, guide plate 38' is formed with a circular central bore 39' which loosely encircles the drive shaft 35 and a cylindrical outer periphery 40' with a loose fit inside the end plate flange 31' so that shaft 35 and the rotatable structure 30,31,30',31', 32,33,34 can rotate with respect to guide plate 38', and vice versa.

On its inside face (i.e., the face away from end plate 31'), guide plate 38' is formed with a plurality of radial grooves 41' evenly spaced apart circumferentially and each extending radially outward to and beyond the eccentric inner periphery 37 of cam plate 32. Each radial groove 41' has a concave inner end at 42' which defines a radially inward limit stop for the corresponding ball B.

The other guide plate 38 is a mirror image of guide plate 38', presenting radial grooves 41 which are aligned with the grooves 41' in guide plate 38' and which terminate at their inner ends in concave surfaces 42.

The aligned pairs of grooves 41 and 41' in the guide plates 38 and 38' together provide radial slot slideways in the guide means along which the corresponding balls B are slidable. A spacer plate 43 is located between guide plates 38 and 38', between the inner ends of their respective grooves 41 and 41' and shaft 35. Preferably, this spacer plate is rotatable on shaft 35 but it may be rigidly affixed to the shaft, if desired.

In the operation of this flywheel, as the drive shaft 35 rotates the rotatable structure made up of end plates 30 and 30', cam plate 32, and bolts and nuts 33,34 on the axis A, the balls B are thrown out by centrifugal force along the radial grooves 41 and 41' in guide plates 38 and 38' against the eccentric inner surface 37 of cam plate 32. At any given rotational position of cam plate 32 with respect to guide plates 38 and 38'. the individual balls B are at various distances radially outward from the rotational axis A of the drive shaft 35, as shown in FIG. 5. The balls provide a rotational torque eccentric to the axis A which causes the guide plates 38 and 38' to rotate in unison with each other in the same direction as shaft 35 but at a slower speed. Thus, the balls B and the guide plates 38 and 38' form a rotating mass inside the rotatable structure made up of end plates 30 and 30', cam plate 32, and bolts and nuts 33,34 which tends to maintain the rotational speed of shaft 35 when the external energy input to it changes.

The conventional flywheel requires a brake to stop it, but this flywheel does not. This flywheel accelerates or decelerates strictly by changing the speed, as a set of gears would do.

I claim:

1. A flywheel comprising:

a rotatable structure having a predetermined axis of rotation, said rotatable structure including cam means having an annular cam surface extending eccentrically around said axis;

means for driving said rotatable structure for rotation on said axis;

guide means inside said rotatable structure presenting a plurality of slideways which extend out from said axis;

and a plurality of rollers operatively coupled to said guide means to slide along said slideways, said rollers being engageable with said cam surface to be displaced toward and away from said axis during the rotation of said rotatable structure;

said guide means being rotatably mounted with respect to said rotatable structure at the inside of said rotatable structure and being coupled to said rotatable structure only through said rollers.

2. A flywheel according to claim 1 wherein:

said cam means comprises an outer annular cam plate with an inner periphery eccentric to said axis, and an inner cam plate with an outer periphery parallel to said inner periphery of the outer cam plate and defining therewith an annular track eccentric to said axis;

and said rollers are slidably received in said annular track between said outer and inner cam plates.

3. A flywheel according to claim 2 wherein:

said guide means comprises a guide plate having a plurality of slots therein which extend substantially radially of said axis and constitute said slideways;

and said rollers are slidably received individually in said slots as well as in said annular track between said outer and inner cam plates.

4. A flywheel according to claim 1 wherein:

said rotatable structure comprises opposite end plates spaced apart along said axis and an annular housing body extending between said end plates around said axis;

said cam means comprises, on the inside of each end plate, a respective outer annular cam plate with an inner periphery eccentric to said axis and a respective inner cam plate with an outer periphery parallel to the inner periphery of the corresponding outer cam plate and defining therewith an annular track eccentric to said axis;

said guide means comprises, next to each pair of said outer and inner cam plates, a respective guide plate with a plurality of slots therein extending substantially radially of said axis and constituting said slideways;

and said rollers are slidably received individually in said slots in said guide plates and slidably received in said annular tracks between the corresponding outer and inner cam plates.

5. A flywheel according to claim 4 wherein:

each of said rollers has necks of reduced cross-sectional diameter slidably received respectively in said slots in the guide plates, and each roller has segments of substantially larger cross-sectional diameter on opposite sides of each guide plate, whereby to maintain said reduced diameter necks of the rollers in said slots in the guide plates.

6. A flywheel according to claim 1 wherein:

said cam means comprises an annular cam plate with an inner periphery eccentric to said axis;

and said rollers are slidable centrifugally along said slideways in said guide means to engage said inner periphery of said cam plate.

7. A flywheel according to claim 6 wherein:

said guide means comprises a pair of guide plates inside said rotatable structure on opposite sides of said cam plate, said guide plates having respective aligned grooves which are open toward each other on opposite sides of the cam plate and extend substantially radially of said axis out to said inner periphery of said cam plate and provide said slideways;

and said rollers are balls slidably received individually in the aligned grooves of the respective guide plates and engageable with said inner periphery of said cam plate.

8. A flywheel according to claim 7 wherein:

said rotatable structure comprises first and second opposite end plates having respective annular flanges extending toward each other and surrounding said guide plates on opposite sides of said cam plate.

9. A flywheel according to claim 8 wherein:

said means for driving said rotatable structure comprises a rotary shaft passing rotatably through said guide plates and rigidly attached to said end plates.

10. A flywheel according to claim 7 wherein:

said means for driving said rotatable structure comprises a rotary shaft passing rotatably through said guide plates.

* * * * *